(12) United States Patent
Lu et al.

(10) Patent No.: US 9,021,895 B2
(45) Date of Patent: May 5, 2015

(54) TORQUE SENSOR ASSEMBLY AND METHOD FOR PRODUCING SAME

(75) Inventors: Engelbert Lu, Ann Arbor, MI (US); Jeremy Gonyou, Warren, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 13/696,696

(22) PCT Filed: May 13, 2011

(86) PCT No.: PCT/US2011/036418
§ 371 (c)(1),
(2), (4) Date: Nov. 7, 2012

(87) PCT Pub. No.: WO2011/143544
PCT Pub. Date: Nov. 17, 2011

(65) Prior Publication Data
US 2013/0055828 A1    Mar. 7, 2013

Related U.S. Application Data

(60) Provisional application No. 61/334,596, filed on May 14, 2010.

(51) Int. Cl.
*G01L 3/00* (2006.01)
*B62D 6/10* (2006.01)
*G01L 3/10* (2006.01)

(52) U.S. Cl.
CPC .. *B62D 6/10* (2013.01); *G01L 3/101* (2013.01)

(58) Field of Classification Search
USPC ....................................... 73/862.08
See application file for complete search history.

(56) References Cited

U.S. PATENT DOCUMENTS

| | | |
|---|---|---|
| 7,028,545 B2 | 4/2006 | Gandel et al. |
| 7,273,357 B2 | 9/2007 | Hattori et al. |
| 7,293,472 B2 | 11/2007 | Tokunoto et al. |
| 7,302,940 B2 | 12/2007 | Schneider et al. |
| 7,312,545 B2 | 12/2007 | Sasaki et al. |
| 7,339,370 B2 | 3/2008 | Raimer et al. |
| 7,406,884 B2 | 8/2008 | Jerems et al. |

(Continued)

FOREIGN PATENT DOCUMENTS

| CN | 1727859 A | 2/2006 |
|---|---|---|
| CN | 101078658 A | 11/2007 |

(Continued)

OTHER PUBLICATIONS

International Search Report for Case No. PCT/US2011/036418 dated Jan. 10, 2012.

(Continued)

*Primary Examiner* — Lisa Caputo
*Assistant Examiner* — Octavia Hollington
(74) *Attorney, Agent, or Firm* — MacMillan, Sobanski & Todd, LLC

(57) ABSTRACT

An improved structure for a torque sensor assembly adapted for use in a vehicle steering system and method for producing the same. According to one embodiment, the torque sensor assembly includes a housing formed from a suitable material having a cavity; at least one flux concentrator and at least one hall effect IC disposed in the cavity of the housing; and a cover secured to the housing to close the cavity in the housing in a permanent and fluid-tight manner.

19 Claims, 10 Drawing Sheets

(56) References Cited

U.S. PATENT DOCUMENTS

| | | |
|---|---|---|
| 7,415,898 B2 | 8/2008 | Ishihara et al. |
| 7,526,963 B2 | 5/2009 | Wanami et al. |
| 7,745,952 B2 | 6/2010 | Nakatsu et al. |
| 7,886,619 B2 * | 2/2011 | Kaoku et al. ............. 73/862.331 |
| 2006/0006749 A1 | 1/2006 | Sasaki et al. |
| 2007/0145838 A1 | 6/2007 | Uchitani et al. |
| 2007/0157740 A1 | 7/2007 | Jerems et al. |
| 2007/0272472 A1 | 11/2007 | Matsubara et al. |
| 2008/0128195 A1 | 6/2008 | Kubota et al. |
| 2008/0277385 A1 | 11/2008 | Thanigachalam et al. |
| 2008/0295612 A1 | 12/2008 | Rachui et al. |

FOREIGN PATENT DOCUMENTS

| | | |
|---|---|---|
| CN | 201062001 Y | 5/2008 |
| CN | 101273194 A | 9/2008 |
| DE | 102004055124 A1 | 5/2006 |
| DE | 102005055949 A1 | 5/2007 |
| EP | 1816457 A2 | 8/2007 |
| WO | 2008068334 A1 | 6/2008 |
| WO | 2008068339 A1 | 6/2008 |

OTHER PUBLICATIONS

Communication from the European Patent Office, for TRW Automotive U.S. LLC, for Reference EPA-120 012, Application No./Patent No. 11781342.8-1755 / 2569610 PCT/US201100036418, with a Supplemental European Search Report dated Apr. 9, 2014.

Notification of First Chinese Office Action, Application No. CN201180023919.7, dated Mar. 5, 2014.

First Office Action from Japanese Patent Office for Application No. 201180023919.7, Applicant TRW Automotive U.S. LLC dated Mar. 5, 2014.

State Intellectual Property Office of the People's Republic of China, with Search Report, etc., for TRW Automotive U.S. LLC Application No. 201180023919.7 dated Nov. 15, 2014.

* cited by examiner

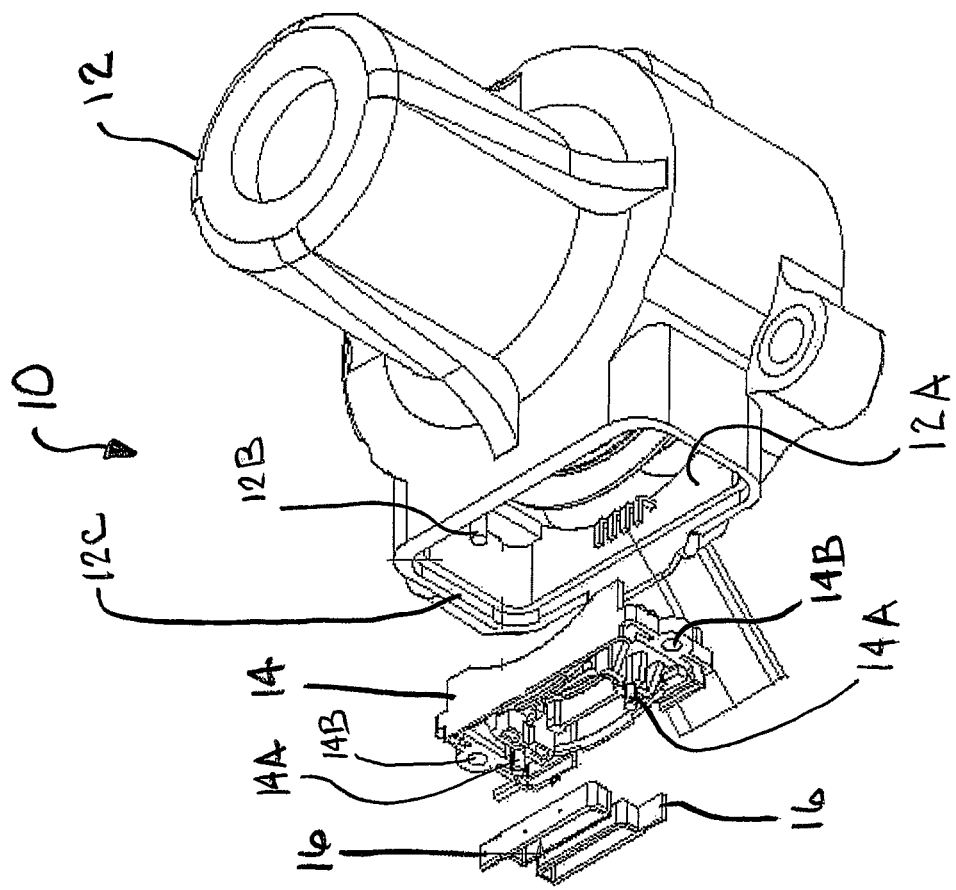
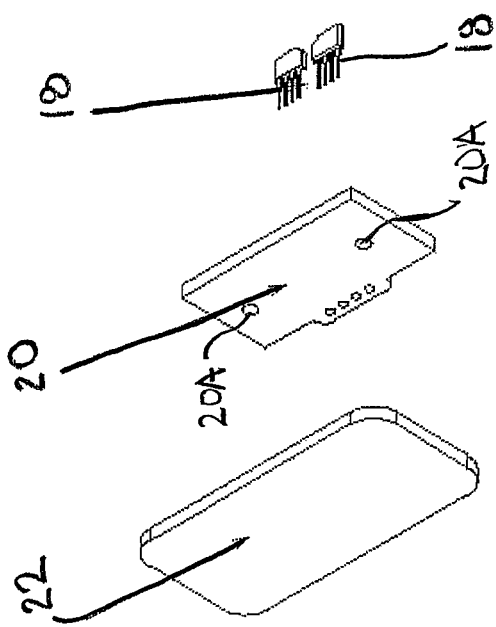
FIG. 1

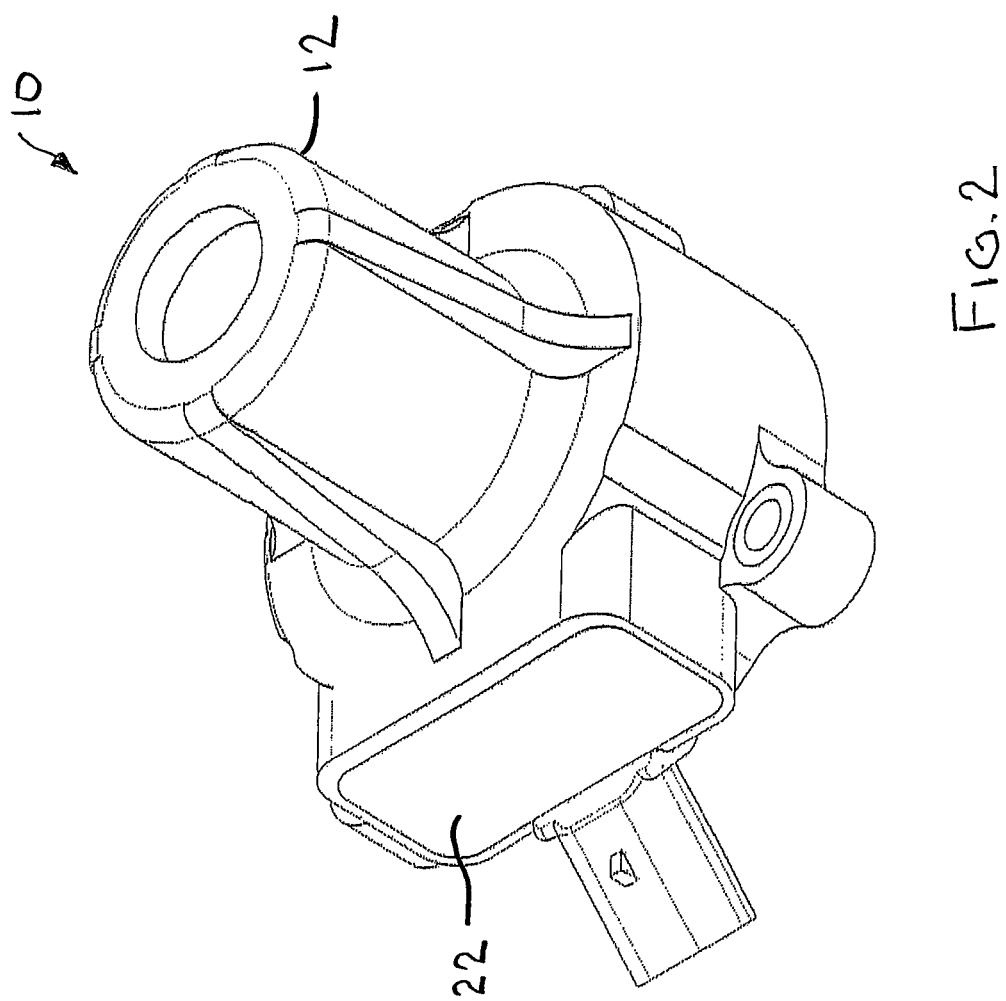

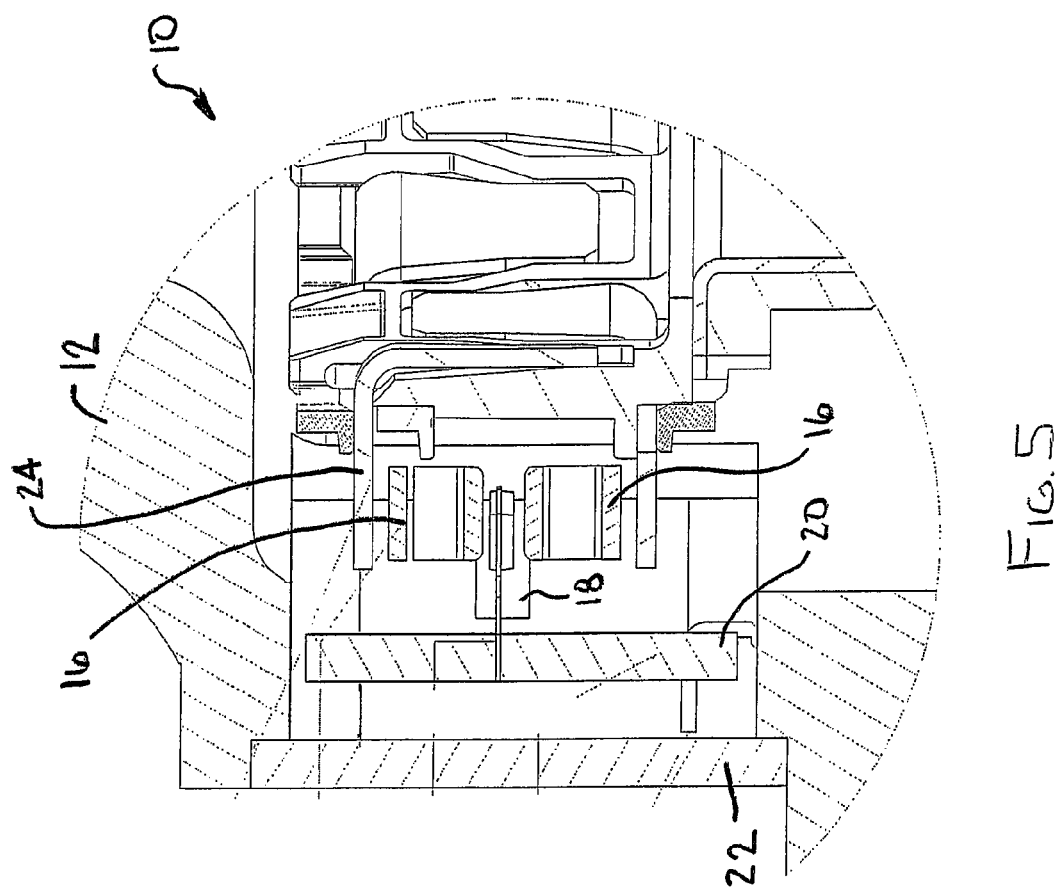

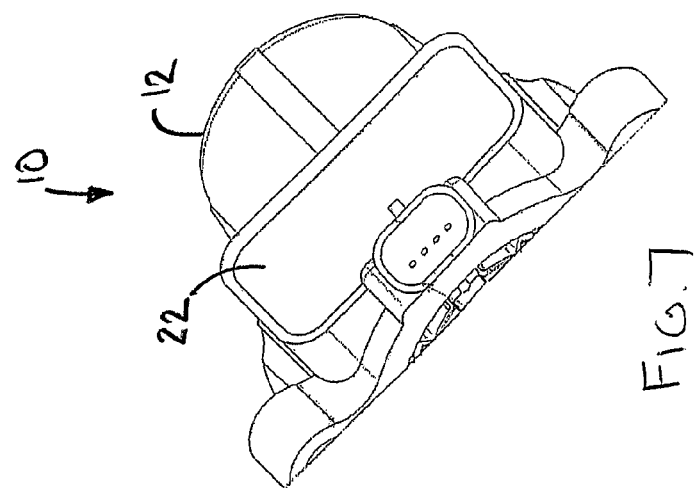
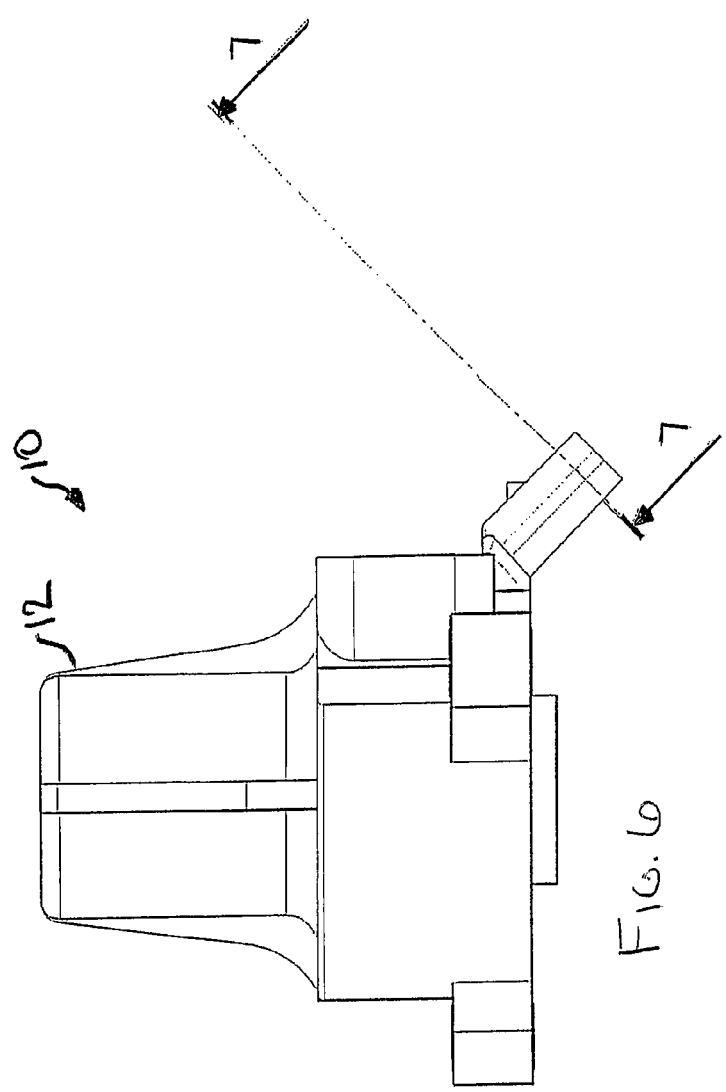
FIG. 7
FIG. 6

TORQUE SENSOR ASSEMBLY AND METHOD FOR PRODUCING SAME

BACKGROUND OF THE INVENTION

This invention relates in general to vehicle steering systems and in particular to an improved torque sensor assembly particularly adapted for use in such a vehicle steering system and method for producing the same.

A torque sensor assembly is well known in the art in connection with a vehicle electric steering system for the purpose of measuring the torsion of the associated steering column. Examples of know torque sensors are shown in U.S. Pat. No. 6,912,923 B2 to Froehlich, et al., U.S. Pat. No. 7,028,545 B2 to Gandel, et al., and U.S. Pat. No. 7,415,898 B2 to Ishihara et al.

SUMMARY OF THE INVENTION

This invention relates to an improved structure for a torque sensor assembly particularly adapted for use in a vehicle steering system and method for producing the same.

According to one embodiment, the torque sensor assembly includes a housing formed from a suitable material having a cavity; at least one flux concentrator and at least one hall effect IC disposed in the cavity of the housing; and a cover secured to the housing to close the cavity in the housing in a permanent and fluid-tight manner. In this embodiment, the cover is formed separate from the housing and is secured to the housing by laser welding. The torque sensor assembly can further include a carrier which is disposed in the cavity of the housing and the at least one flux concentrator and at least one hall effect IC are disposed in the carrier. The torque sensor assembly can further include a printed circuit board which is attached to the carrier.

According to another embodiment, the torque sensor assembly includes a housing formed from a suitable material having a cavity; at least one flux concentrator and at least one hall effect IC disposed in the cavity of the housing; and a cover secured to the housing to close the cavity in the housing in a permanent and fluid-tight manner. In this embodiment, the cover is formed as part of the housing during an overmolding process, and the at least one flux concentrator and the at least one hall effect IC are secured within the housing during the overmolding process.

According to another embodiment, a method for producing a torque sensor assembly comprising the steps of: (a) disposing at least one flux concentrator and at least one hall effect IC in a cavity of a housing of the torque sensor assembly; and (b) securing a cover to the housing to close the cavity by a laser welding process.

According to another embodiment, a method for producing a torque sensor assembly comprising the steps of: (a) disposing at least one flux concentrator and at least one hall effect IC in a cavity of a housing of the torque sensor assembly; and (b) securing a cover to the housing to close the cavity by a laser welding process; wherein step (a) further includes the step of disposing the at least one flux concentrator and the at least one hall effect IC in a carrier to produce a carrier assembly which is then disposed in the cavity of the housing of the torque sensor assembly prior to performing step (b).

According to another embodiment, a method for producing a torque sensor assembly comprising the steps of: (a) disposing at least one flux concentrator and at least one hall effect IC disposed in a tooling mold; and (b) forming a housing of the torque sensor assembly in situ in the tooling mold by an overmolding process; wherein the housing includes a cover formed as part of the housing during the overmolding process.

Other advantages of this invention will become apparent to those skilled in the art from the following detailed description of the preferred embodiments, when read in light of the accompanying drawings.

BRIEF DESCRIPTION OF THE DRAWINGS

FIG. 1 is an exploded view of a first embodiment of a torque sensor assembly in accordance with the present invention.

FIG. 2 is a perspective view of the first embodiment of the torque sensor assembly illustrated in FIG. 1, the first embodiment of the torque sensor assembly being shown in its assembled state.

FIG. 5 is an enlarged view of a selected portion of the first embodiment of the torque sensor assembly illustrated in FIGS. 1 and 2, with a carrier of the torque sensor assembly being not shown for clarity.

FIG. 6 is another side view of the first embodiment of the torque sensor assembly illustrated in FIGS. 1 and 2.

FIG. 7 is a sectional view taken along line 7-7 of FIG. 6 of the first embodiment of the torque sensor assembly illustrated in FIGS. 1 and 2.

DETAILED DESCRIPTION OF THE PREFERRED EMBODIMENTS

Figure 4:
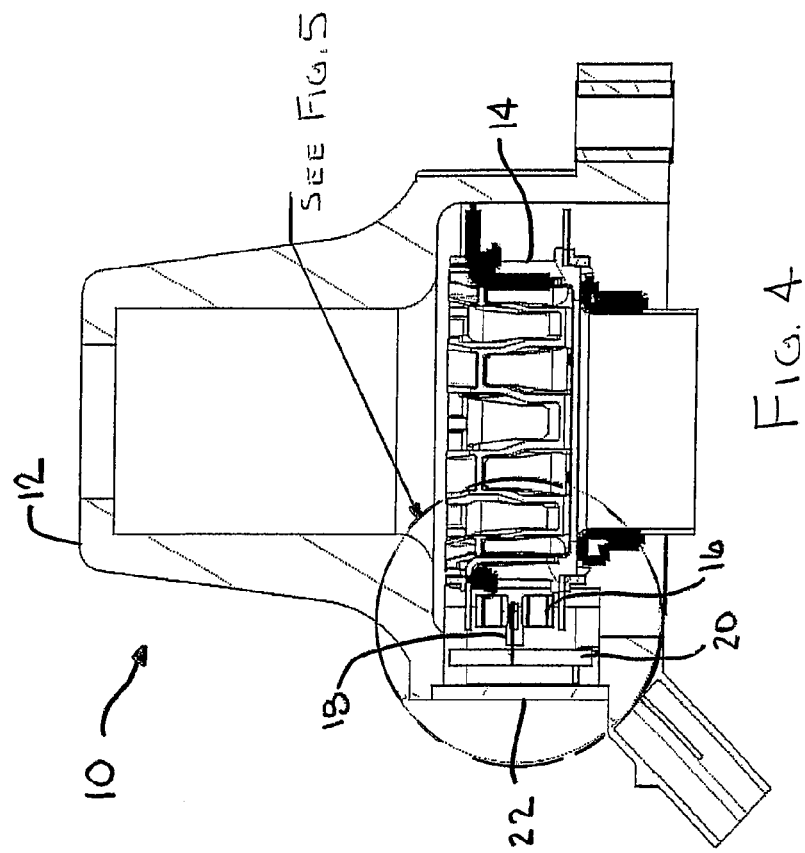
FIG. 4 is a sectional side view taken along line 4-4 of FIG. 3 of the first embodiment of the torque sensor assembly illustrated in FIGS. 1 and 2.
Figure 3:
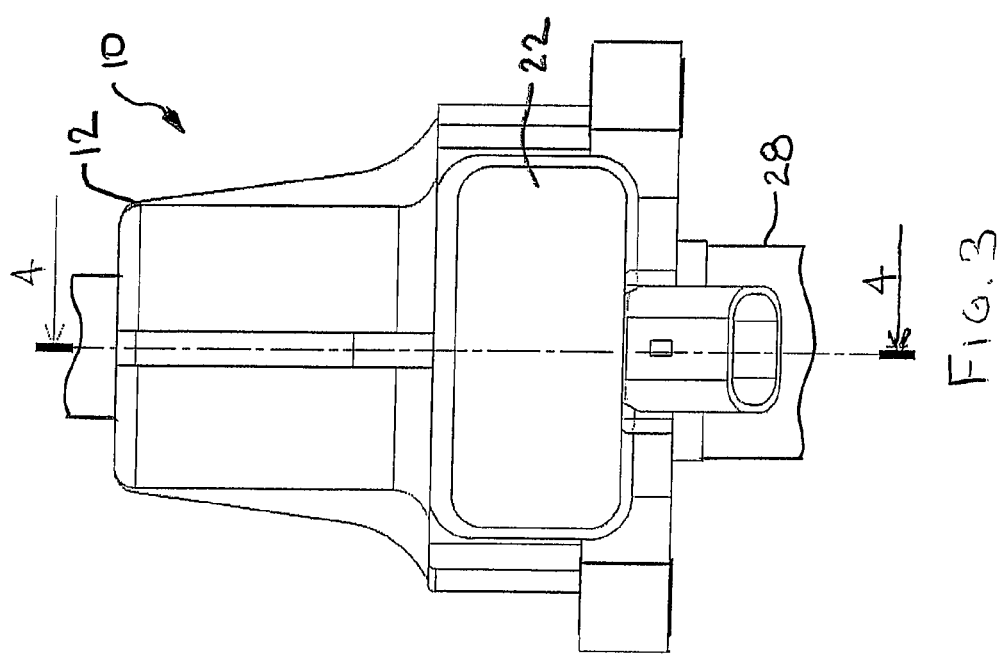
FIG. 3 is a front view of the first embodiment of the torque sensor assembly illustrated in FIGS. 1 and 2.
Figure 9:
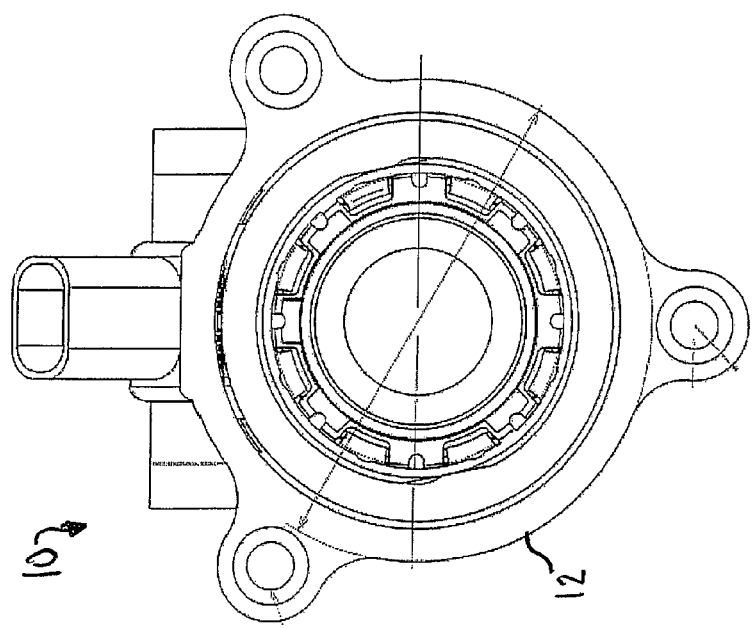
FIG. 9 is a bottom view of the first embodiment of the torque sensor assembly illustrated in FIGS. 1 and 2.
Figure 8:
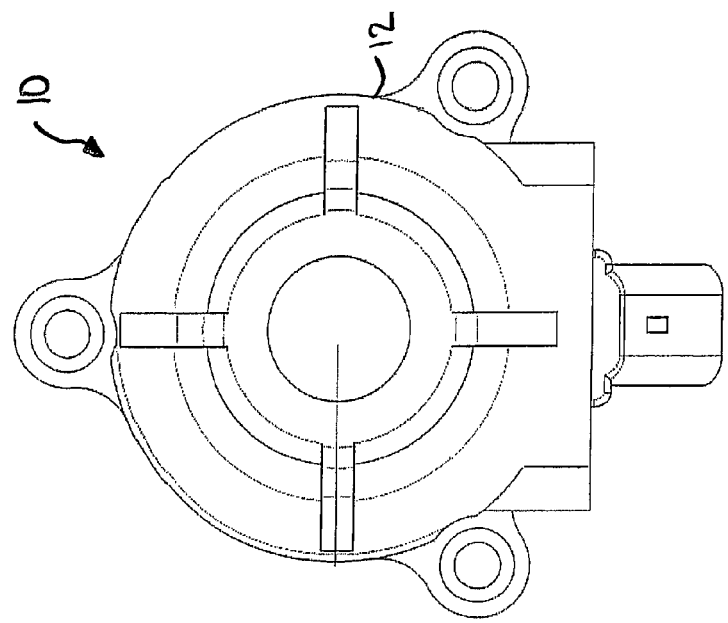
FIG. 8 is a top view of the first embodiment of the torque sensor assembly illustrated in FIGS. 1 and 2.
Figure 10:
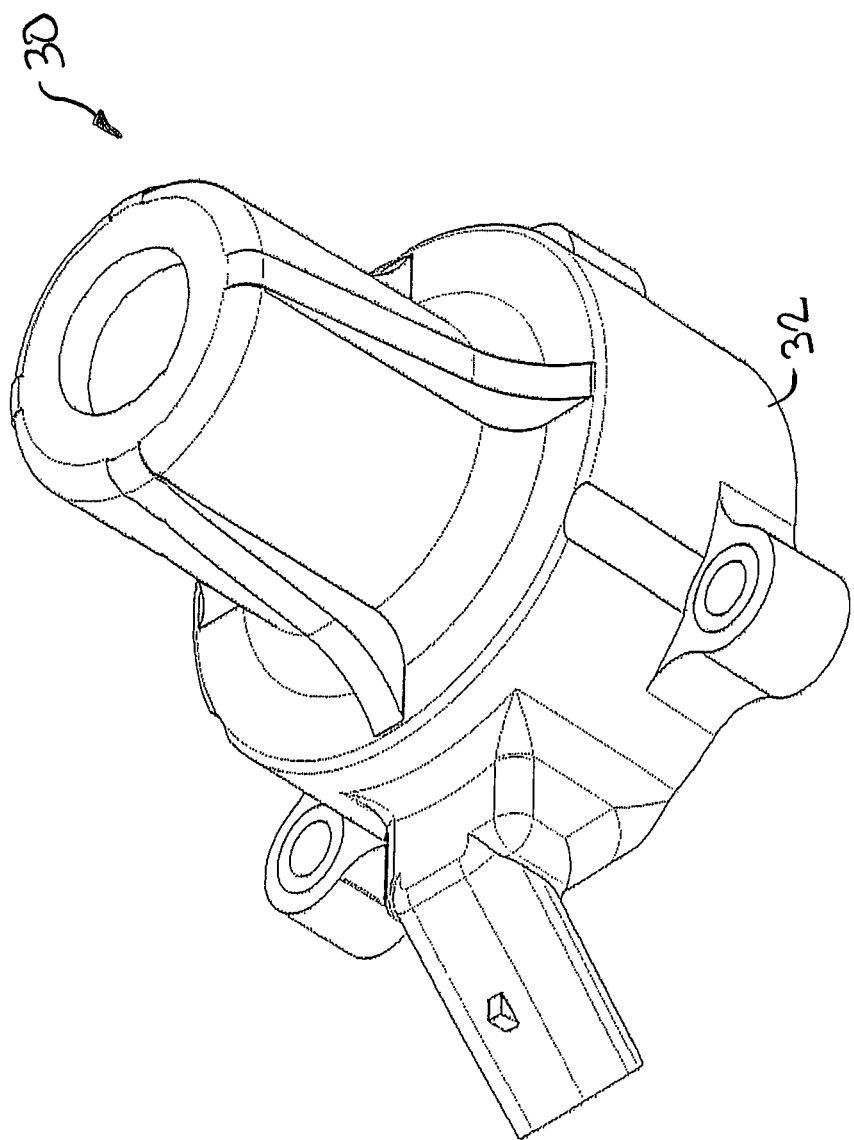
FIG. 10 is a perspective view of a second embodiment of a torque sensor assembly in accordance with the present invention, the second embodiment of the torque sensor assembly being shown in its assembled state.
Figure 12:
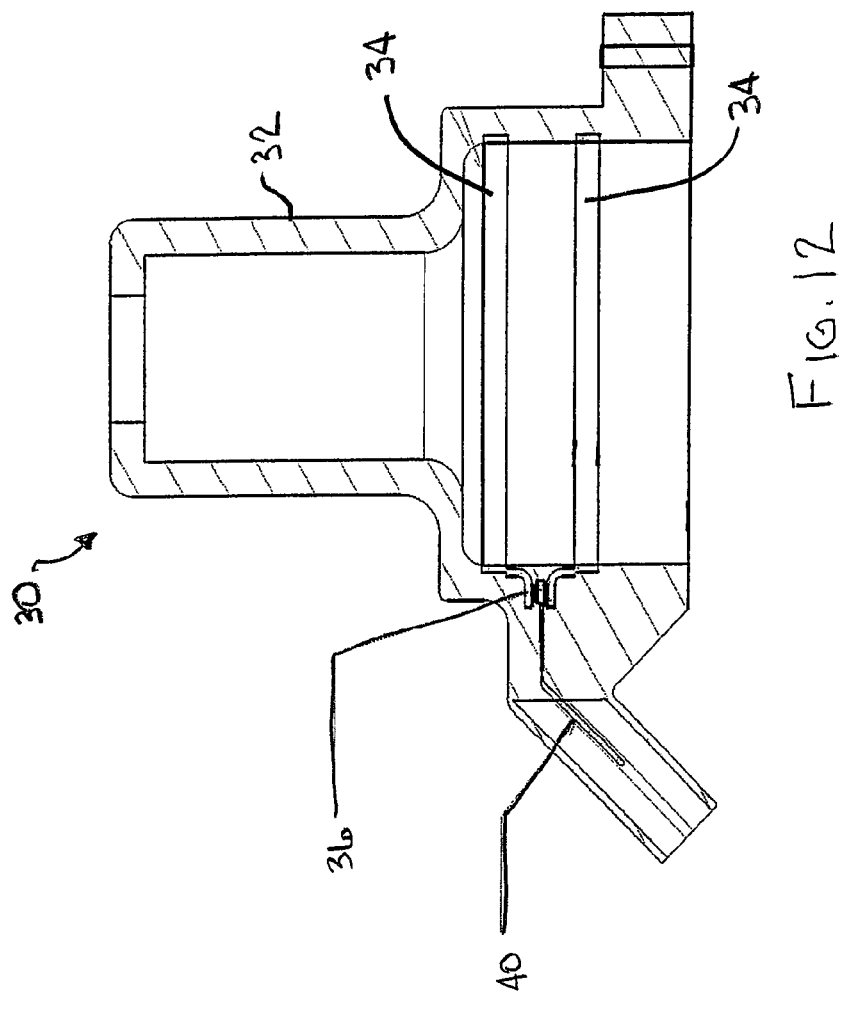
FIG. 12 is a sectional side view taken along line 12-12 of FIG. 11 of the second embodiment of the torque sensor assembly illustrated in FIG. 10.
Figure 11:
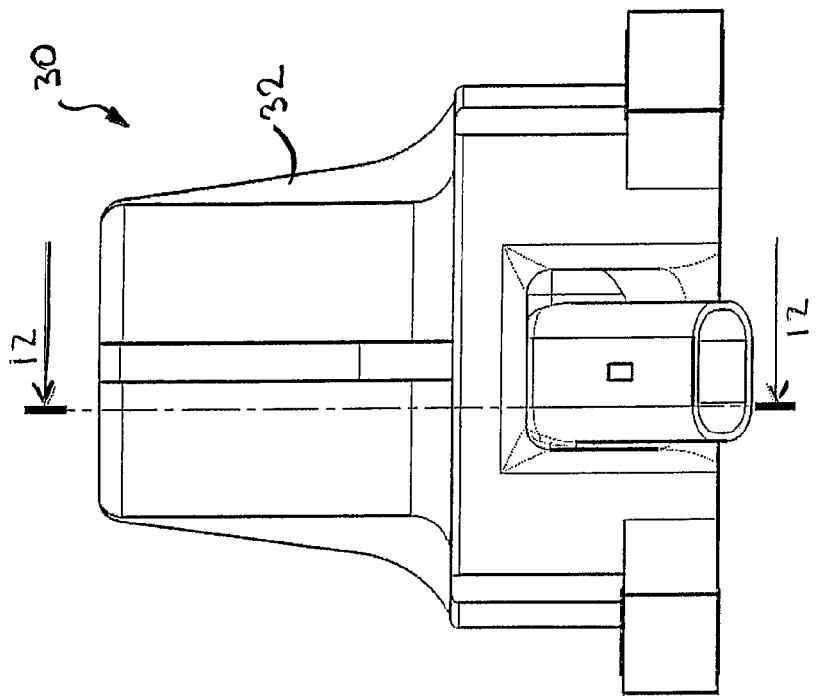
FIG. 11 is a front view of the second embodiment of the torque sensor assembly illustrated in FIG. 10.
Figure 14:
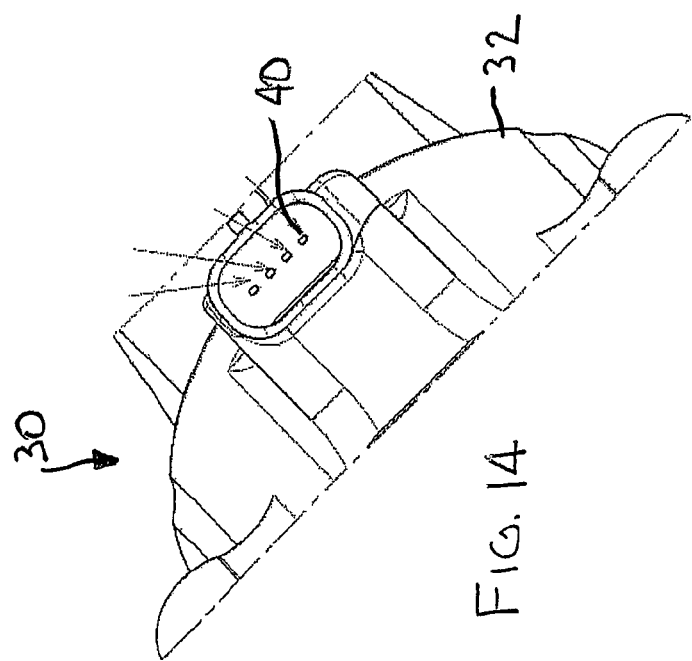
FIG. 14 is a sectional view taken along line 14-14 of FIG. 13 of the second embodiment of the torque sensor assembly illustrated in FIG. 10.
Figure 13:
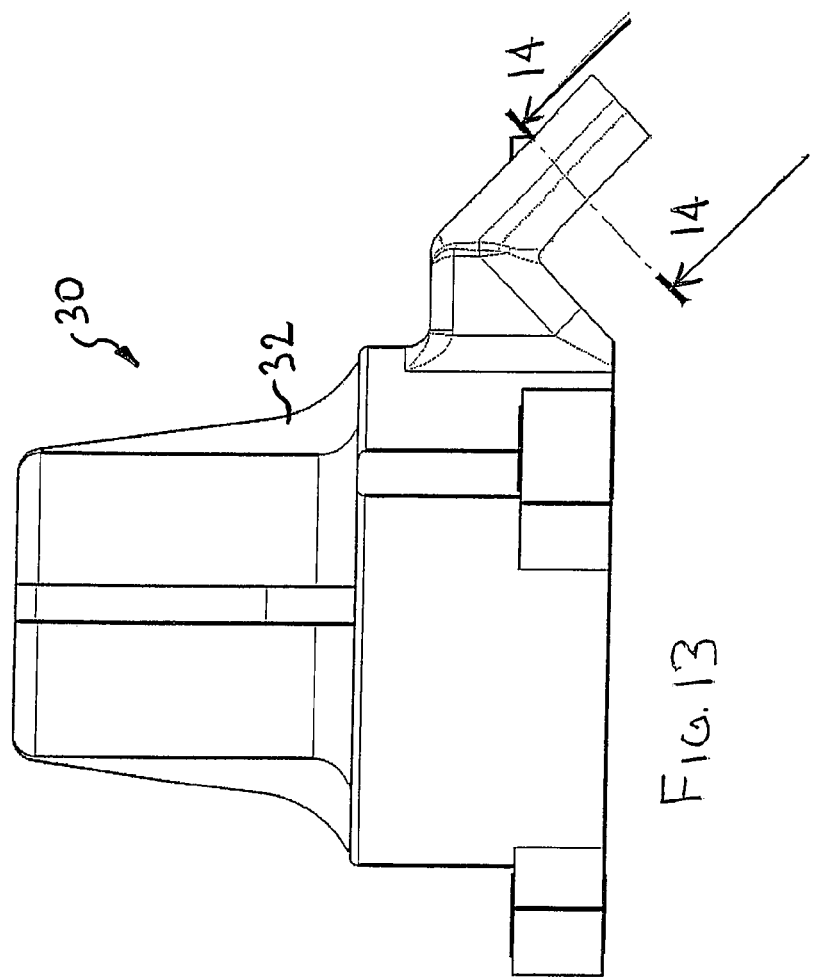
FIG. 13 is another side view of the second embodiment of the torque sensor assembly illustrated in FIG. 10.

Referring now to FIGS. 1-9, there is illustrated a first embodiment of a torque sensor assembly, indicated generally at 10, constructed in accordance with the present invention. The torque sensor assembly 10 is preferably adapted to be installed onto a pinion shaft 28 (a portion of which is shown in FIG. 3), which is part of a vehicle steering system (not shown). As best shown in one or both of FIGS. 1 and 5, the illustrated torque sensor assembly 10 includes a housing 12, a carrier 14, a pair of flux concentrators 16, a pair of hall effect IC's (integrated circuits) 18, a printed circuit board 20, a cover 22 and a stator 24 disposed on the pinion shaft S.

In the illustrated embodiment, the torque sensor assembly 10 can be assembled as follows. First, the stator 24 is disposed on the pinion shaft 28 and then the housing 12 is disposed on the pinion shaft 28 relative to the stator 24. The flux concentrators 16 and the hall Effect IC's 18 are disposed in the carrier 14 and the printed circuit 20 is installed on the carrier 14 to produce a carrier assembly. To assist in this, in the illustrated embodiment the carrier 14 is preferably provided with a positioning or locating means or member. In the illustrated embodiment, this is illustrated as being a pair of "upstanding" projections 14A on the carrier 14 which are disposed or received in a pair openings 20A provided in the printed circuit board 20.

Next, this carrier assembly is disposed in a cavity or opening 12A the housing 12. To assist in this, in the illustrated embodiment the housing 12 is preferably provided with a positioning or locating means or member. In the illustrated embodiment, this is illustrated as being a pair of "upstanding" projections 12B (only one of which is shown), on the housing 12 which are disposed or received in a pair of openings 14B provided in the carrier 14.

Following this, in the illustrated embodiment, the cover 22 is installed and secured to the housing 12 by preferably a laser welding process along an outer periphery of the cover 22. To assist in this, in the illustrated embodiment the housing 12 is preferably provided with a positioning or locating means or member. In the illustrated embodiment, this is illustrated as being a stepped portion or shoulder 12C on the housing 12 to receive the cover 22 therewithin. To accomplish the laser welding process in the illustrated embodiment, the housing 12 and the cover 22 are preferably formed from suitable like materials, such as for example plastic, which enable the laser welding process to be utilized to secure the housing 12 and the cover 22 together.

Alternatively, the housing 12 and/or the cover 22 may be formed from other suitable materials, which may be like and/or non-like materials, which enable the laser welding process to be utilized or any other suitable process or method to be used in order to preferably permanently attach the cover 22 to the housing 12 in a preferably water-tight manner. Examples of such other suitable materials for the cover 22 and/or the housing 12 can include for example, non-metal materials and/or metal materials. Examples of other suitable processes or methods to preferably permanently attach the cover 22 to the housing 12 can include for example, other suitable welding processes selected depending upon the materials for the cover 22 and the housing 12 and/or the use of a suitable adhesive.

One advantage of the first embodiment of the torque sensor assembly 10 is that after the carrier assembly has been installed in the housing 12, the cover 22 is permanently secured to the housing 12 by, in the preferred embodiment, a laser welding process. As a result of this, the chances of water, dirt, debris, or other foreign bodies or contaminants entering past the cover 22 and into the cavity 12A of the housing 12 is virtually reduced or eliminated since the laser welding process is operative to form a fluid-tight seal between the cavity 12A of the housing 12 and the cover 22. Alternatively, the structure or configuration of one or more of the components of the first embodiment of the torque sensor assembly 10 can be other than illustrated and described if so desired. Also, the method for assembling and/or securing the components of the first embodiment of the torque sensor 10 together can be other than illustrated and described if so desired.

Referring now to FIGS. 10-17, there is illustrated a second embodiment of a torque sensor assembly, indicated generally at 30, constructed in accordance with the present invention. As best shown in one or more of FIGS. 10-17, the illustrated torque sensor assembly 30 includes a housing 32, a pair of flux concentrators 34, a pair of hall effect IC's 36, a stator 38, and connector terminals and lead frame 40.

Figure 16:
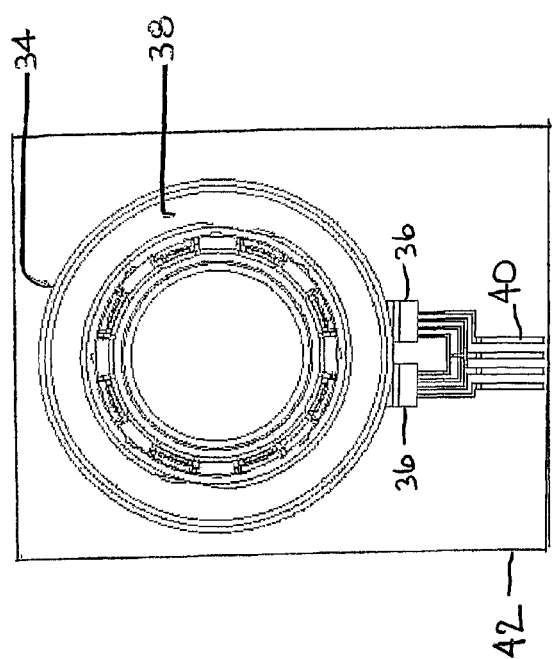
FIG. 16 is a top view of the second embodiment of the torque sensor assembly illustrated in FIG. 10 having the overmold portion of the housing removed for clarity.
Figure 17:
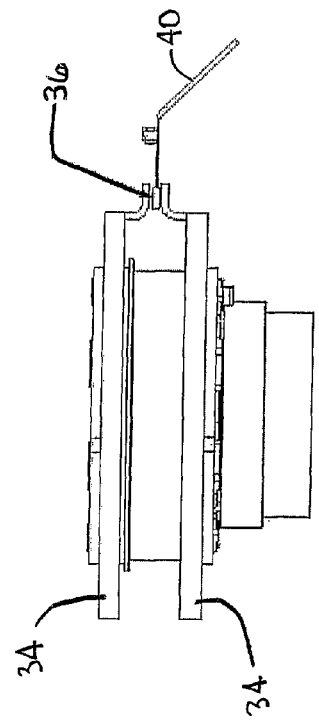
FIG. 17 is another side view of the second embodiment of the torque sensor assembly illustrated in FIG. 10 which is similar to FIG. 13 but having the overmold portion of the housing removed for clarity.
Figure 15:
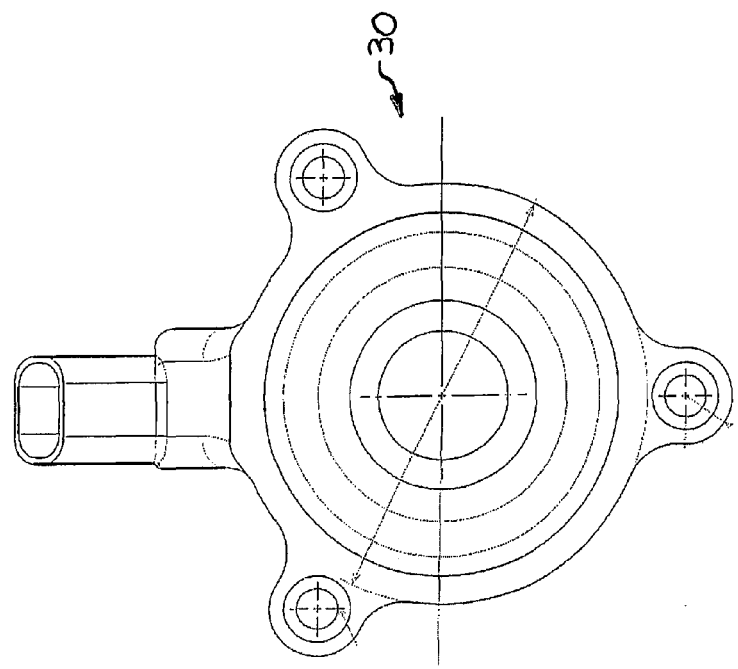
FIG. 15 is a bottom view of the second embodiment of the torque sensor assembly illustrated in FIG. 10.

In the illustrated embodiment, the torque sensor assembly 30 can be assembled as follows. First, at least the illustrated components of the torque sensor assembly 30, which include at least the flux concentrators 34, the hall effect IC's 36, the stator 38 and the connector and lead frame 40 are disposed in a tooling mold 42 (which is schematically shown in FIG. 16). Next, the housing 32 is overmolded in situ to produce the finished or overmolded torque sensor assembly 30 of the second embodiment. To assist in this, in the illustrated embodiment the housing 32 is preferably formed from a suitable material which can be utilized in a suitable molding process, such as for example plastic, which can be utilized in an injection plastic molding process or other suitable molding process.

One advantage of the second embodiment of the torque sensor assembly 30 is that the housing 32 is formed as an overmolded housing. As a result of this, water, dirt, debris, or other foreign bodies or contaminants entering through the housing 32 to the components housed therewithin is virtually reduced or eliminated since the overmolding process is operative to enclose the components of the torque sensor assembly 30 which are housed therein in a fluid-tight manner.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A torque sensor assembly comprising:
   a housing having a cavity;
   at least one flux concentrator and at least one hall effect IC disposed in the cavity of the housing; and
   a cover secured to the housing to close the cavity in a permanent and fluid-tight manner, wherein the cover is formed separate from the housing and is secured to the housing by laser welding.

2. The torque sensor assembly of claim 1 wherein the housing is provided with a first positioning means for positioning the cover relative thereto.

3. The torque sensor assembly of claim 1 wherein the assembly further includes a carrier which is disposed in the cavity of the housing and wherein the at least one flux concentrator and at least one hall effect IC are disposed in the carrier to produce a carrier assembly.

4. The torque sensor assembly of claim 3 wherein the housing is provided with a second positioning means for positioning the carrier relative thereto.

5. The torque sensor assembly of claim 3 wherein the assembly further includes a printed circuit board which is attached to the carrier.

6. The torque sensor assembly of claim 3 wherein the carrier is provided with a positioning means for positioning the printed circuit board relative thereto.

7. A method for producing a torque sensor assembly comprising the steps of:

(a) disposing at least one flux concentrator and at least one hall effect IC in a cavity of a housing of the torque sensor assembly; and (b) securing a cover to the housing to close the cavity by a laser welding process.

8. The method of claim 7 wherein the housing is provided with a first positioning means for positioning the cover relative thereto prior to performing step (b).

9. The method of claim 8 wherein the housing is provided with a second positioning means for positioning the carrier relative thereto.

10. The method of claim 7 further wherein step (a) further includes the step of disposing the at least one flux concentrator and the at least one hall effect IC in a carrier to produce a carrier assembly which is then disposed in the cavity of the housing of the torque sensor assembly prior to performing step (b).

11. The method of claim 7 wherein step (a) further includes the step of attaching a printed circuit board to the carrier.

12. The method of claim 11 wherein the carrier is provided with a positioning means for positioning the printed circuit board relative thereto.

13. The method of claim 7 wherein step (b) secures the cover to the housing in a permanent and fluid-tight manner.

14. The method of claim 7 wherein the cover and the housing are formed from plastic.

15. A torque sensor assembly comprising:
a housing having a cavity;
at least one flux concentrator and at least one hall effect IC disposed in the cavity of the housing; and
a cover secured to the housing to close the cavity in a permanent and fluid-tight manner, wherein the cover is formed separate from the housing, the housing is provided with a first positioning means for positioning the cover relative to the housing, the cover and the housing are formed from like materials, and the cover is secured to the housing by laser welding.

16. The torque sensor assembly of claim 15 wherein the assembly further includes a carrier which is disposed in the cavity of the housing and wherein the at least one flux concentrator and at least one hall effect IC are disposed in the carrier to produce a carrier assembly.

17. The torque sensor assembly of claim 16 wherein the housing is provided with a second positioning means for positioning the carrier relative thereto.

18. The torque sensor assembly of claim 17 further including a printed circuit board which is attached to the carrier.

19. The torque sensor assembly of claim 18 wherein the carrier is provided with a positioning means for positioning the printed circuit board relative thereto.

* * * * *